(12) United States Patent
Sarna

(10) Patent No.: US 7,809,061 B1
(45) Date of Patent: Oct. 5, 2010

(54) METHOD AND SYSTEM FOR HIERARCHICAL DATA REUSE TO IMPROVE EFFICIENCY IN THE ENCODING OF UNIQUE MULTIPLE VIDEO STREAMS

(75) Inventor: Lalit Sarna, Mountain View, CA (US)

(73) Assignee: Vidiator Enterprises Inc., New Providence (BS)

(*) Notice: Subject to any disclaimer, the term of this patent is extended or adjusted under 35 U.S.C. 154(b) by 1903 days.

(21) Appl. No.: 10/763,772

(22) Filed: Jan. 22, 2004

(51) Int. Cl.
*H04N 7/12* (2006.01)
*H04N 11/02* (2006.01)

(52) U.S. Cl. .................... 375/240.16; 375/240.29

(58) Field of Classification Search ........... 375/240.02, 375/240.1
See application file for complete search history.

(56) References Cited

U.S. PATENT DOCUMENTS

| | | | |
|---|---|---|---|
| 5,231,484 A | 7/1993 | Gonzales et al. | |
| 5,801,778 A * | 9/1998 | Ju | 375/240.15 |
| 6,229,850 B1 * | 5/2001 | Linzer et al. | 375/240.11 |
| 6,337,881 B1 * | 1/2002 | Chaddha | 375/240.16 |
| 6,535,632 B1 | 3/2003 | Park et al. | |
| 7,184,578 B2 | 2/2007 | Simon et al. | |
| 7,266,149 B2 | 9/2007 | Holcomb et al. | |
| 7,272,180 B2 * | 9/2007 | Dambrackas | 375/240.01 |
| 2002/0165844 A1 | 11/2002 | Lee et al. | |
| 2002/0186890 A1 | 12/2002 | Lee et al. | |
| 2002/0196355 A1 | 12/2002 | Hiroshige et al. | |
| 2003/0001964 A1 | 1/2003 | Masukura et al. | |
| 2003/0206664 A1 | 11/2003 | Gomila et al. | |
| 2004/0117427 A1 * | 6/2004 | Allen et al. | 709/200 |
| 2005/0013359 A1 | 1/2005 | Srinivasan | |
| 2008/0002902 A1 | 1/2008 | Lin et al. | |

OTHER PUBLICATIONS

U.S. Appl. No. 10/815,280, filed Mar. 30, 2004, Sarna.
Duda et al., "Pattern Classification and Scene Analysis," Chapter 5—Linear Discriminant Functions, 1973; pp. 130-134.

* cited by examiner

*Primary Examiner*—David Czekaj
(74) *Attorney, Agent, or Firm*—Schwabe, Williamson & Wyatt, P.C.

(57) ABSTRACT

Data is shared across several simultaneous software video encode/compressions sessions with a common input video source. This reduces the amount of work done by each individual encoder by intelligently sharing/reusing data between encoders at various stages of encoding. Each encoder may use the data from another encoder "as-is" or may further minimally process the data. This data sharing reduces the overall encoding time of the streams significantly by reducing the duplicative work that would otherwise have to be performed by each encoder. Data sharing thus enables production of more simultaneous unique compressed video streams per encoding station. To allow sharing and reuse of data between encoders, various modules in the encoding pipeline operate in a hierarchical manner and use each other's output data, and cooperate to produce multiple unique video streams that may differ in format, bit rate, resolution, frame rate, or other video characteristic.

22 Claims, 7 Drawing Sheets

METHOD AND SYSTEM FOR HIERARCHICAL DATA REUSE TO IMPROVE EFFICIENCY IN THE ENCODING OF UNIQUE MULTIPLE VIDEO STREAMS

TECHNICAL FIELD

The present disclosure generally relates to video encoding, and more particularly but not exclusively, relates to hierarchical data reuse or data sharing techniques to improve efficiency in video encoding when producing multiple unique video streams from a common input source.

BACKGROUND INFORMATION

In the wireless video communication field, there is rarely a uniform standard for video. Various organizations, content providers, device manufacturers, and/or service providers are free to use and support any one or more video standards (e.g., variations in format, frame rate, bit rate, color scheme, etc.), which may at times be incompatible with each other. As a result, systems have been developed to transcode one or more video inputs into multiple unique video streams (each having different formats, frame rates, bit rates, etc.), where the end terminal devices can receive and play back a compatible and supported one of the video streams.

In encoding stations that produce multiple unique video streams from at least one common video input source (e.g., raw unformatted video input), multiple software encoders are provided. Each of these encoders performs their own independent and separate encoding process on the raw video input. For instance, one encoder in the encoding station may encode the unformatted video input into Motion Pictures Expert Group-4 (MPEG-4) video having a 352×288 resolution, 512 kbps bit rate, YUV color scheme, 15 frames/second frame rate, and so on. Another encoder in the encoding station may encode the unformatted video input into MPEG-4 video having a 160×128 resolution, 200 kbps bit rate, YUV color scheme, 15 frames/second frame rate, and so on.

Software video compression or video encoding is a computationally expensive task. The amount of processing power available per software encoding station is the limiting factor on the number of video encodings that can be performed simultaneously per encoding station. The independent and separate processing performed by each encoder results in significant redundant processing, which wastes processor cycles and therefore reduces the overall number of outputs and/or throughput speed of unique video streams.

BRIEF SUMMARY OF THE INVENTION

According to one aspect of the invention, a method is provided to encode multiple video outputs from a common input video source. The method includes temporally sub-sampling video frames of the common input video source to reduce a frame rate, and converting a color format of the video frames from a first format to a second format. The method then performs full motion estimation on a first sequence of video frames and generates motion estimation data to substantially match blocks of pixels from one video frame to another video frame in the first sequence, and generates a first video output using the generated motion estimation data. The method further includes reusing the generated motion estimation data to perform partial motion on at least a second sequence of video frames to substantially match blocks of pixels from one video frame to another video frame in the second sequence and modifies the generated motion estimation data to correspond to blocks of pixels in the second sequence that match, and generates a second video output using the modified motion estimation data.

According to one aspect, an article of manufacture, comprises a machine-readable medium having instructions stored thereon to cause a processor to encode multiple video outputs from common input video data, by: determining data producer and data user relationships between encoder components; directing output produced from a first encoder component to a second encoder component in a same first encoder; directing the output produced from the first encoder component to another encoder component in a second encoder different from the first encoder; and using the output from the first encoder component in the second encoder component and producing output from the second encoder that is modified from the output produced by the first encoder.

In one aspect of the article of manufacture, producing output from the first encoder component includes producing full motion estimation data, and using the output from the first encoder component in the second encoder component includes using at least some of the produced motion estimation data to locate an approximate location of a block of pixels in a frame without performing full motion estimation.

In one aspect of the article of manufacture, the motion estimation data includes motion vector information.

In one aspect of the article of manufacture, the machine-readable medium further has instructions stored thereon to cause the processor to encode multiple video outputs from common input video data, by: temporally sub-sampling video frames of the common input video source to reduce a frame rate; converting a color format of the video frames from a first format to a second format; and hierarchically Human Visual System (HVS)-based pre-processing the video frames to obtain different bit rates and to remove high frequency information from the video frames.

In one aspect of the article of manufacture, the machine-readable medium further has instructions stored thereon to cause the processor to encode multiple video outputs from common input video data, by adapting the hierarchical HVS-based pre-processing based on outputs from subsequent encoder component processing.

DETAILED DESCRIPTION

Figure 1:
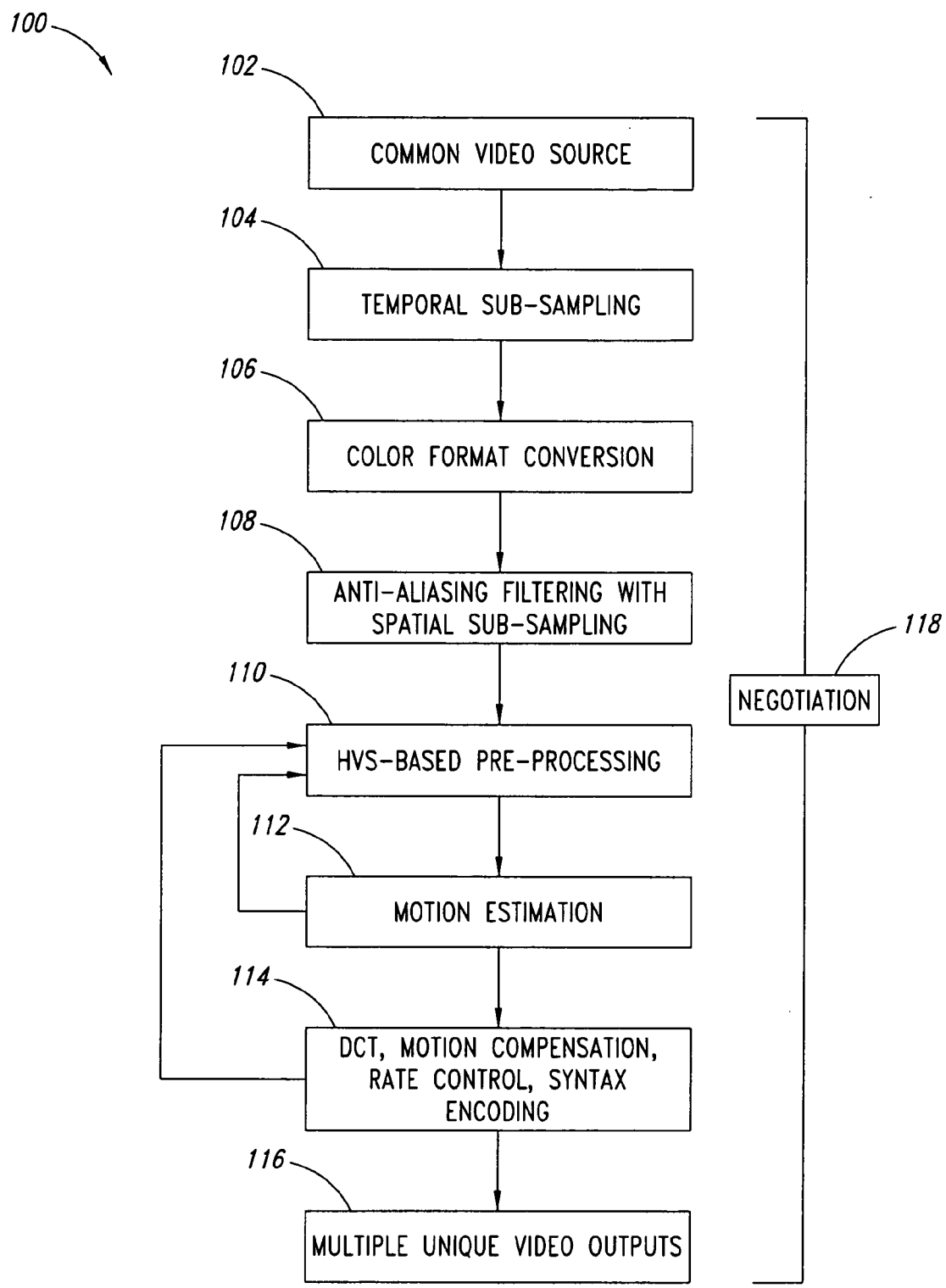
FIG. 1 is a flowchart that illustrates an example video encoding process with which an embodiment of the invention may be implemented.

Embodiments of techniques for hierarchical data reuse to improve efficiency in the encoding of unique multiple video streams are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention involves the sharing of data across many simultaneous software video encode/compressions sessions with a common input video source. This reduces the amount of work done by each individual encoder by intelligently sharing/reusing data between encoders at various stages of encoding. Each encoder may use the data from another encoder "as-is" or may further minimally process the data to fit the needs of appropriate encoding parameters. This data sharing reduces the overall encoding time of the streams significantly by reducing the duplicative work that would otherwise have to be performed by each encoder. Data sharing thus enables production of more simultaneous unique compressed video streams per encoding station. To enable sharing and reuse of data between encoders, various modules (such as software modules) in the encoding pipeline operate in a hierarchical manner in one embodiment, and cooperate to produce multiple unique video streams that may differ in format, bit rate, resolution, frame rate, or other video characteristic or parameter.

One embodiment of the invention enables the reuse of data between multiple encoders at different stages of encoding. This data reuse saves computational bandwidth and time, since the results from one encoder component (a "publisher" or "producer") can be used by one or more other encoders' components (a "client" or "consumer"). The client encoders may use the published data without further modification or may further modify the data to fit that client encoder's needs. The computational bandwidth required to modify the data is significantly less, as compared to the amount of computational bandwidth that would be required to produce the data when the data has not undergone previous processing by other encoders.

Example implementations for embodiments of the invention include scenarios where multi-resolution, multi-bit rate, or multi-format compressed videos are desired from a common source. Such video can be compressed or encoded for a file or for a live broadcast, for instance. In another implementation, the hierarchical data sharing technique may be used to transcode pre-compressed video into multiple videos, where the common source is decoded output of the pre-compressed video. It is understood that these are but a few example implementations and that others are possible.

FIG. 1 is a high-level flowchart that illustrates an example video encoding process 100 with which one embodiment of the invention may be implemented. More specifically and as will be described later below, one embodiment of the invention hierarchically reuses or shares data, which is produced in at least some of sub-processes 102-116 of the encoding process 100, for subsequent other encoding sub-processes. This data sharing avoids the need to independently and separately perform redundant processing on the data, and instead allows certain sub-processes in the encoding process to use data that has already been processed at some level by other components. The various sub-process blocks 102-116 of FIG. 1 will be shown and described in further detail in connection with FIGS. 2-6.

In the process 100 of FIG. 1, sub-process blocks 102-116 are shown. It is appreciated that these sub-process blocks 102-116 are not intended to be exhaustive of all the possible encoding operations that may be involved in an encoding session. Various sub-processes may not be used/present or may be modified in other encoding schemes. Other encoding schemes may also use sub-processes that are different or in addition to what is shown and described herein. It is appreciated that the hierarchical data sharing technique may be applied to such other encoding schemes to reduce the amount of separate and independent redundant processing. It is further appreciated that the various sub-processes do not necessarily need to be performed in the exact order shown. At least some of the components of the process 100 (as well as components of other processes shown and described herein) may be implemented in software or other machine-readable instruction stored on a machine-readable medium.

Beginning at the block 102, video is received from a common video source. For example, a particular content provider may provide raw unformatted video of a program (e.g., a sporting event, news clip, interview, etc.), which will be encoded or transcoded via the process 100 to provide multiple unique video stream outputs having the program but with different formats, resolutions, bit rates, etc. There may be multiple content providers or other entities that provide raw video content, which individually comprise common video sources that will each be encoded into multiple unique video streams.

At the block 104, the raw video undergoes temporal sub-sampling to reduce the frame rate of the video. Color format conversion is performed at the block 106, where the video may undergo color format conversion to change the color format from one color scheme to another color scheme (e.g., from RGB to YUV, or vice versa).

In an embodiment, the temporal sub-sampling and color format conversion at the blocks 104 and 106 may be performed only once for all encoders, such as in a situation where all encoders in the encoding station will use the same frame rate and color format. This technique avoids the need for repetitive processing, and is in contrast to some existing techniques where each encoder individually and redundantly does the same temporal sub-sampling and color conversion for their respective inputs.

The process 100 performs anti-aliasing filtering and spatial sub-sampling at the block 108 to change the resolution to a lower resolution. In one embodiment, Human Visual System (HVS) pre-processing is then performed at the block 110 on the input video frames of each encoder to reduce the high-frequency information in a frame. Reducing the high-frequency information optimizes the compression efficiency and maximizes the perceived video quality of a compressed sequence for a given bit rate.

In the block 112, motion estimation is performed to search in a specified search area in a previous frame for a candidate block that is most similar to a current block in a current frame. A motion vector is generated during the motion estimation that is indicative of the relative position of the blocks between the two frames. In an embodiment that will be described later below, full motion estimation is performed by only one of the encoders, and then that encoder's results are progressively used by the other encoders (working with a lower resolution or smaller frames) to estimate the location of the similar macroblocks of pixels in their respective frames. That is, after one of the encoders has generated motion vectors to predict the general location of macroblocks from one frame to another frame, the other encoders can reuse the same motion vectors to predict the location of similar macroblocks in the frames that they are processing (e.g., perform partial motion estimation and motion vector sharing, rather than having to perform their own full motion estimation and motion vector generation).

Final encoding operations are performed at the block 114. These operations can include, but are not limited to, discrete cosine transform (DCT) operations, motion compensation to use the results of the motion estimation of the block 112 to generate frames, rate control, and syntax encoding. The results of the block 114 can be fed back to the HVS-based pre-processing block 110 (or to some other blocks in the process 100) to provide adaptive features, where outputs can be used to refine or improve prior processes. The multiple unique video streams result as output at the block 116, and can thereafter be transmitted to end terminal devices.

A negotiation block 118 is shown symbolically in FIG. 1, which may be embodied as a software module or other component that can act as a controller to determine the "publisher" and "consumer" relationships between the various encoder components. For example, each particular encoder component can provide the negotiation block 118 with information indicative of data that each particular encoder component will produce as output and will require as input during the various sub-process blocks 102-114. Based on this data and based on logic (including information indicative of data dependencies, which may be provided by the encoders to the negotiation block 118), the negotiation block 118 can control the hierarchical direction and flow of inputs and outputs between the various encoder components, to ensure that each encoder receives the appropriate input when needed and with the input being in a required form/state. An embodiment of an encoding system that is based on components that operate as negotiating "Brokers" and "Traders" of data is described in U.S. application Ser. No. 10/452,809, entitled "APPARATUS AND METHOD FOR TASK SCHEDULING FOR MEDIA PROCESSING," filed May 30, 2003, assigned to the same assignee as the present application, and incorporated herein by reference in its entirety.

To better illustrate operation of an embodiment of the hierarchical data sharing technique, an example will be described next in FIGS. 2-6 by way of data flow diagrams, using specific parameters for frame rates, resolution, bit rate, format, etc. It is appreciated that these parameters are merely illustrative for purposes of explanation and are not intended to limit the invention to the specific example parameters disclosed or to the specific hierarchical data flow. Other embodiments may use different parameters and the hierarchical data flow may be organized differently, based on factors such as number of encoders present, level or degree of encoding refinement and quality desired, data dependencies, or other factors. Encircled reference alphanumerical characters such as A1, B2, C1, etc. are shown in the data flow diagrams to indicate input/output flows and to track where one flow diagram continues to or from another flow diagram on an adjacent drawing sheet.

For purposes of this specific example, it will be assumed that five video output streams ("video sequences") V1-V5 are desired as output from the video encoding station. The example parameters for the format, bit rate, resolution, and frame rate for the video sequences V1-V5 are identified in the table below. As can be seen, certain ones of the video sequences share some common parameters, but may differ in other parameters. For instance, video sequences V1-V3 are in MPEG-4 format but have different bit rates. Video sequences V3 and V4 have different formats (MPEG-4 and H.263) but have the same bit rate, resolution, and frame rate. In this example, all of the video sequences V1-V5 have the same frame rate of 15 frames/second.

| Video Sequence | Format | Bit Rate | Resolution | Frame Rate |
|---|---|---|---|---|
| V1 | MPEG-4 | 512 KBPS | 352 × 288 | 15 FPS |
| V2 | MPEG-4 | 400 KBPS | 352 × 288 | 15 FPS |
| V3 | MPEG-4 | 256 KBPS | 176 × 144 | 15 FPS |
| V4 | H.263 | 256 KBPS | 176 × 144 | 15 FPS |
| V5 | MPEG-2 | 200 KBPS | 160 × 128 | 15 FPS |

Figure 2:
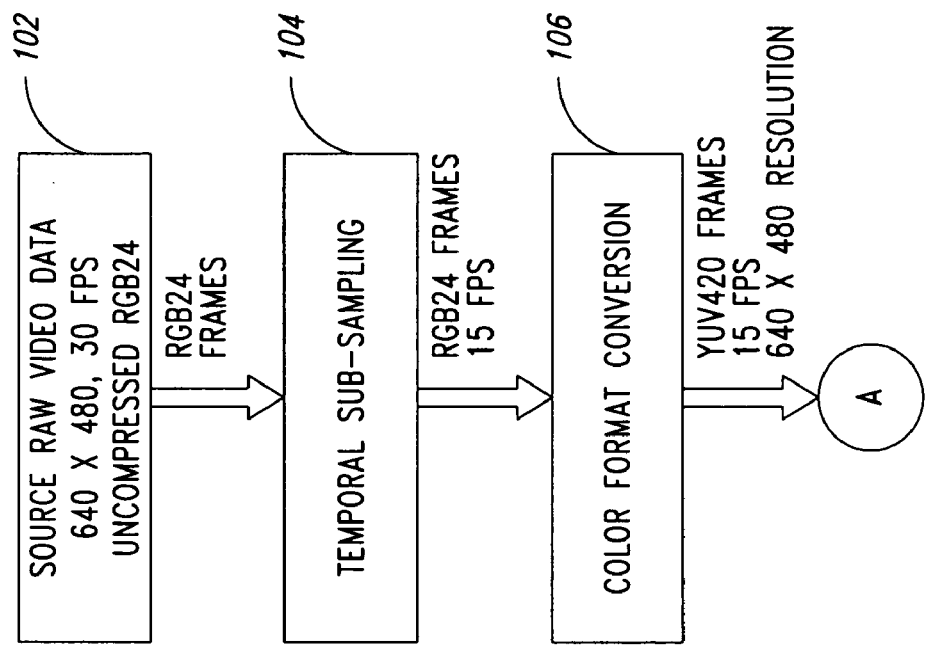
FIGS. 2-6 are data flow diagrams of several portions of the video encoding process of FIG. 1 in accordance with various embodiments of the invention.

FIG. 2 shows blocks 102-106 of FIG. 1 in accordance with an embodiment based on this example. The common video source at the block 102 comprises raw unformatted video data at a resolution of 640×480 and frame rate of 30 frames/second. The color scheme used by the common video source is uncompressed RGB24 format, but can be any other type of color scheme.

The RGB24 frames are fed into the temporal sub-sampling block 104 to reduce the frame rate to 15 frames/second, which is the frame rate to be used by the final output video sequences V1-V5. Techniques for temporal sub-sampling are familiar to those skilled in the art, and therefore will not be described in further detail herein.

In this example and since all of the video sequences V1-V5 will have the same frame rate, the input frames from the block 102 may be temporally sub-sampled once for all five encoders, rather than five times. In situations where there final video sequences V1-V5 have different frame rates, a separate individual temporal sub-sampling may be performed for each encoder in one embodiment (e.g., five separate temporal sub-sampling processes).

In another embodiment, there may also be a hierarchical flow of temporal sub-sampling at the block 104. In this embodiment, a first stage temporally sub-samples the input frames to a lower frame rate. The lower frame rate output can then be used directly by an encoder corresponding to that frame rate, and that lower frame rate output can also be an input to a second stage to be temporally sub-sampled to produce a next lower frame rate output, which will be used by another encoder. This temporal sub-sampling at the block 104 to produce progressively lower frame rates can continue until all of the desired frame rate outputs have been generated.

Color format conversion is performed at the block 106 to change the color scheme of the frames from RGB24 to YUV420. After completion of the color format conversion at the block 106, the frame rate is 15 frames/second and the resolution is unchanged at 640×480 in the video output data (denoted at "A" to indicate a data flow continuation point into the next sub-process 108 in FIG. 3 or 4). In this example, all of the output video sequences V1-V2 have the same YUV420 color scheme, and so the color format conversion at the block 106 is performed once for all five encoders, rather than five times, which results in computational savings.

As with the temporal sub-sampling at the block 104, the color format conversion may be performed individually for some of the encoders in another embodiment. Such may be the case for instance, where some encoders use a color scheme that is different than YUV but which can be derived or otherwise converted from the RGB color scheme of the raw input video data—therefore, these other color schemes need not undergo an intermediate YUV conversion. In other embodiments, it is also possible to provide a hierarchical color conversion process at the block 106 where an RGB color scheme (which can used by a first encoder) is converted to a YUV color scheme (which can be used by a second encoder), which is then converted to some other color scheme (which can then be used by a third encoder), and so forth, in a manner that certain color schemes can be intermediately generated and directly used in some encoders and/or used as input to other color conversion processes.

Figure 3:
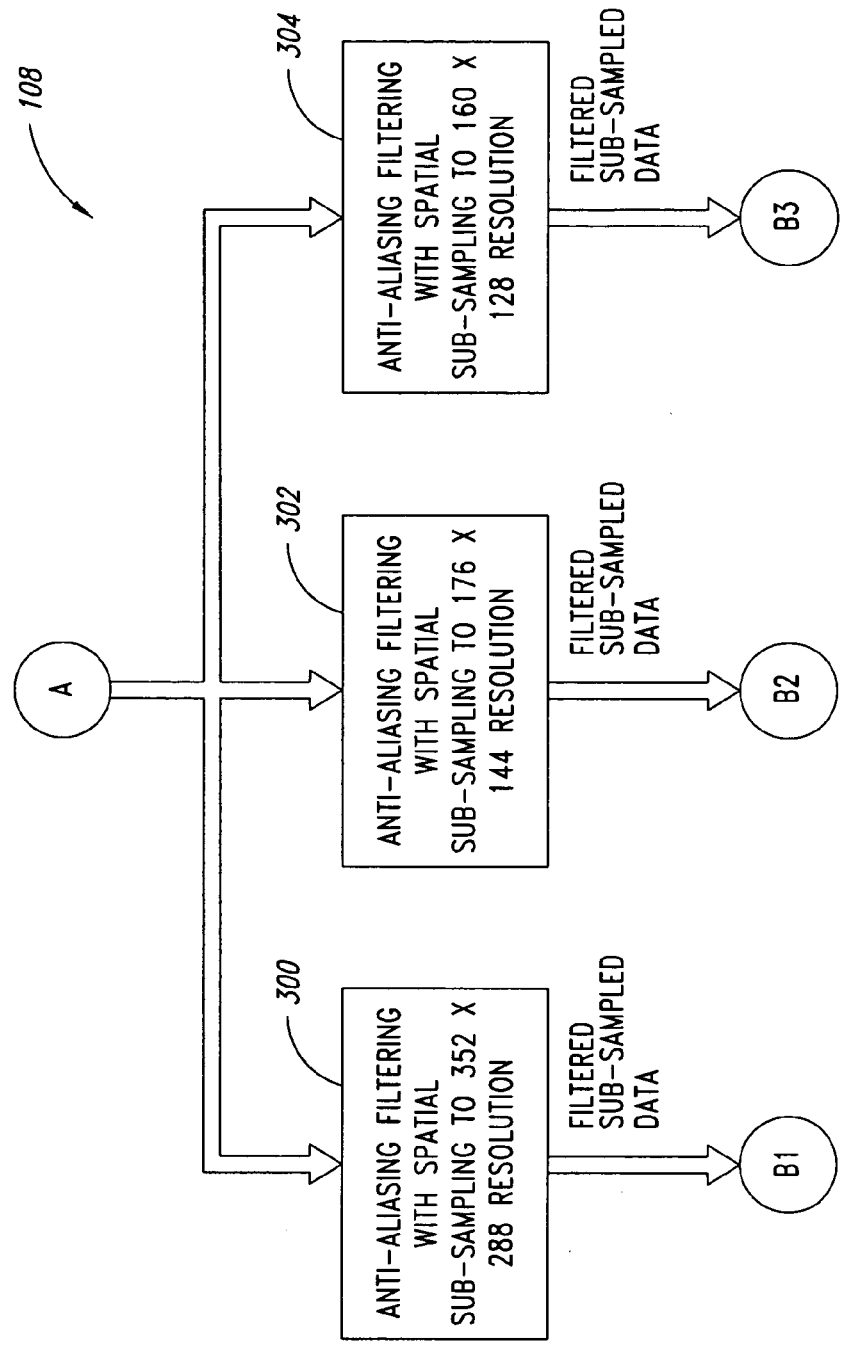
Figure 4:
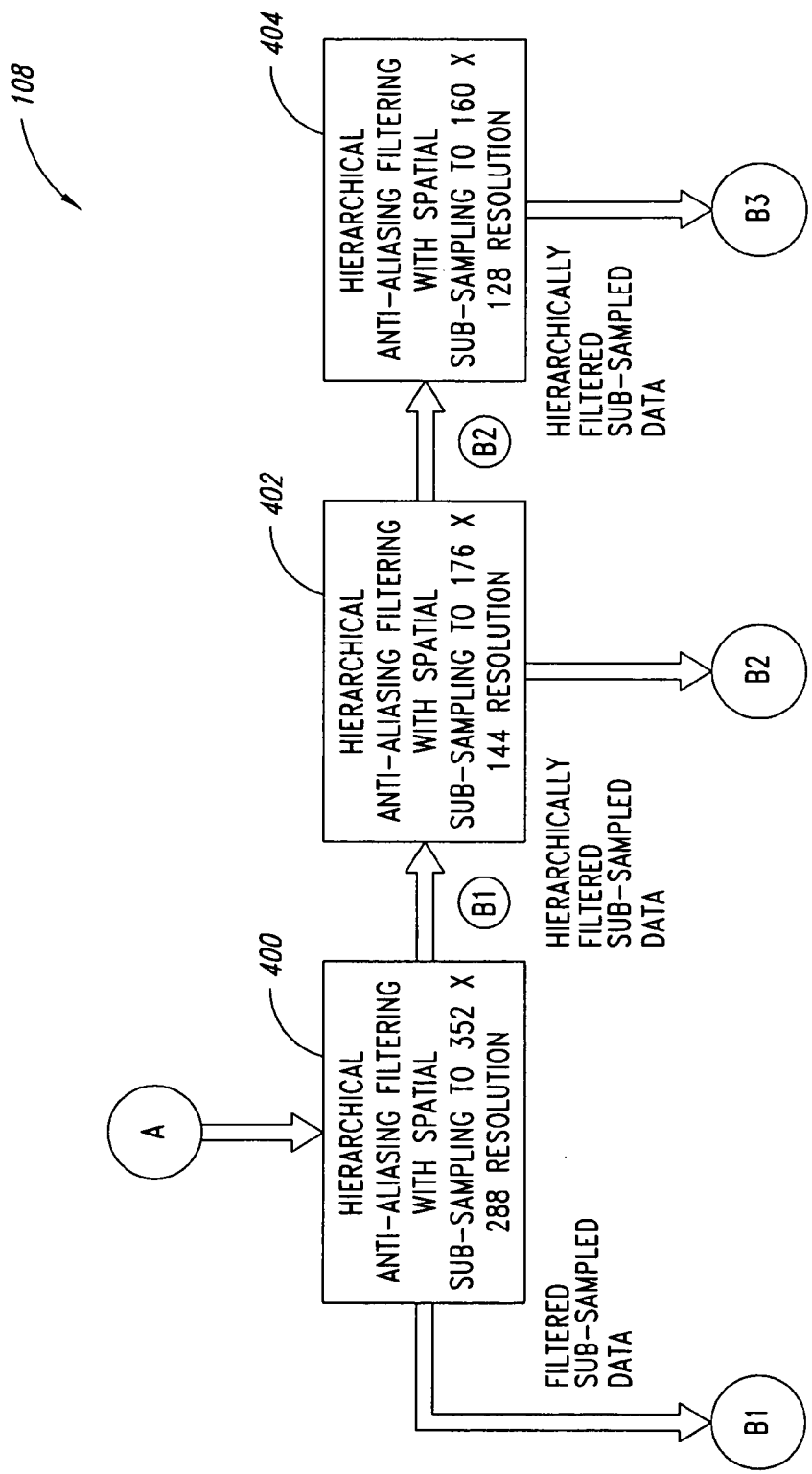

FIGS. 3 and 4 illustrate example embodiments for the anti-aliasing with spatial sub-sampling that is performed at the block 108 to reduce the resolution of the video data. In the embodiment of FIG. 3, separate individual filters are provided at blocks 300-304 to sub-sample the input video data at A (coming in at 640×480 resolution) into three different lower resolutions. Thus, the first block 300 reduces the resolution to 352×288, the second block 302 reduces the resolution to 176×144, and the third block 304 reduces the resolution to 160×128, thereby producing three filtered spatially sub-sampled data at B1, B2, and B3 respectively. The anti-aliasing filtering with sub-sampling at the blocks 300-304 may be performed with software algorithms and other processes that would be familiar to those skilled in the art having the benefit of this disclosure.

It is noted that with the architecture of FIG. 3, it can be computationally expensive to provide a separate complete filtering and sub-sampling process to obtain each different resolution value. Since a relatively large image (640×480) is received as input at A, a correspondingly large filter has to be provided to perform the anti-aliasing filtering and sub-sampling, which is more computationally complex than a smaller size filter.

Therefore, the embodiment of FIG. 4 uses a hierarchical arrangement of anti-aliasing filtering and spatial sub-sampling to generate sequentially lower resolution outputs. Blocks 400-404 are hierarchical anti-aliasing sub-sampling filters that perform anti-aliasing filtering on the input data to achieve optimally sub-sampled data, by exploiting the work done on the input data in a previous block/stage.

To illustrate operation of the embodiment, the block 400 is the sole block that receives the video input at A. The block 400 generates filtered sub-sampled data output at B1 having a resolution of 352×488. The filtered sub-sampled data output of B1 is fed into the next stage of encoding in FIG. 5, and is also fed into the block 402. The block 402 receives the previously filtered sub-sampled data of B1 and generates hierarchically filtered sub-sampled data output at B2 having a resolution of 176×144. The output at B2 is fed into the next encoding stage in FIG. 5, and is also fed into the block 404. The block 404 receives the previously filtered sub-sampled data of B2 and generates hierarchically filtered sub-sampled data output at B3 having a resolution of 160×128.

In the embodiment of FIG. 4, smaller filter sizes may be used, as compared to multiple large filters of FIG. 3 that need to be able to independently accommodate higher resolution video data inputs in order to independently produce each desired sub-sampled resolution. Smaller filters may be used since the input video data, received by any individual filter stage in the hierarchy after the first block 400, has a progressively lower resolution. Examples of hierarchical anti-aliasing sub-sampling filter algorithms and other related technology that may be implemented in one embodiment are available through Vidiator Enterprises, Inc., P.O. Box CB-12751, Nassau, New Providence, Bahamas. Other types of anti-aliasing sub-sampling filters may be used when suitably arranged wherein the output of one filter forms an input to one or more other filters, and the other filter output(s) may be used as input(s) for yet other filter(s).

Figure 5:
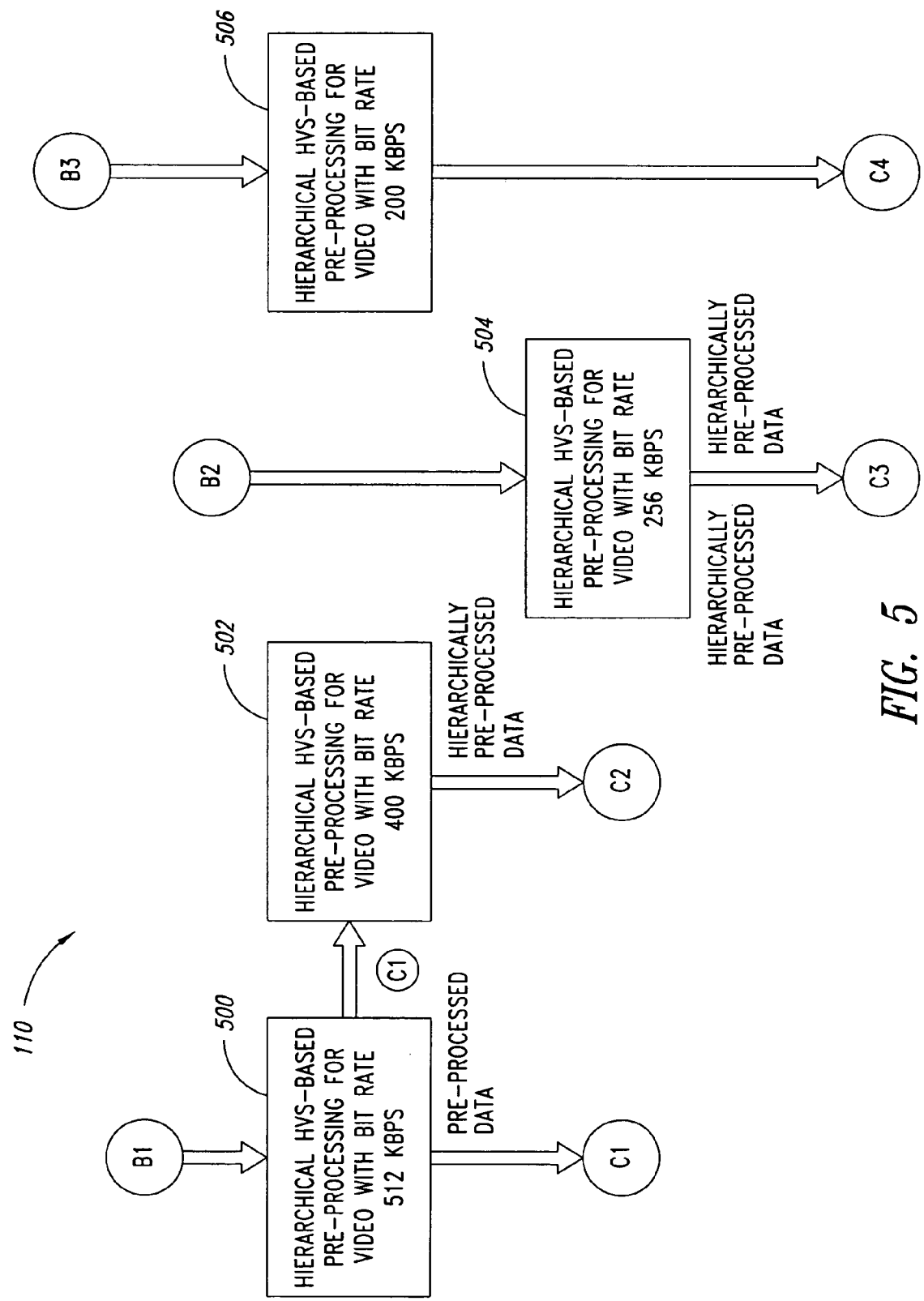

FIG. 5 depicts an embodiment of the next stage in the encoding: the hierarchical HVS-based pre-processing of block 110 in accordance with this example. The goal of HVS-based pre-filtering or pre-processing is to reduce high frequency information in a frame to optimize compression efficiency and maximize perceived video quality of a compressed sequence for a given bit rate. The presence of complex high frequency information in video with limited bit budgets can take heavy tolls on video quality. To match the bit rate constraints, video is typically quantized heavily. However, quantization of high frequency coefficients leads to ringing noise artifacts and mosquito noise artifacts. One possible trade off is to remove the high frequency information from the sequence via linear or non-linear filters so as to avoid such artifacts. This helps to distribute the available bits in encoding low frequency data at higher quality and/or avoids excessive frame dropping due to lack of available bits.

One result of low pass filtering is the blurring of the image. So clearly, the trade off is between having a soft smooth image sequence with minimal frame dropping, versus a crisp image sequence with artifacts and possible higher frame dropping.

The solution to this trade off is very subjective and depends on personal preferences. Human visual sensitivity or Human Visual System (HVS) is inversely proportional to the motion velocity of objects, and HVS-based pre-processing systems is based on the fact that the human eye has a poor response to abrupt rapid changes in a sequence. In one embodiment, each individual block 500-506 of FIG. 5 uses HVS-based pre-processing techniques known by those skilled in the art. However, such an embodiment arranges the HVS-based pre-processing filters in a hierarchical manner between multiple encoders.

For example, the output at C1 of the block 500 is also used as input to the block 502, since these blocks correspond to the output video sequences V1 and V2 having the same resolution of 352×288. The block 500 produces pre-processed data, which is fed into both the next stage in the encoder (see, e.g., the block 600 in FIG. 6) and also into the block 502, which performs HVS-based pre-processing to produce hierarchically pre-processed data at C2. Because the blocks 504 and 506 pertain to video at different resolutions (176×144 versus 160×128, respectively), they are not hierarchically arranged with each other or other blocks in this example. The blocks 504 and 506 generate pre-processed data as output at C3 and C4, respectively.

In another embodiment, the HVS-based pre-processing at the blocks 500-506 of FIG. 5 can be hierarchically arranged, when appropriate, using the HVS-based pre-processing techniques disclosed in U.S. patent application Ser. No. 10/815,280, entitled "HUMAN VISUAL SYSTEM (HVS)-BASED PRE-FILTERING OF VIDEO DATA," filed Mar. 30, 2004, which claims priority from U.S. Provisional Patent Application Ser. No. 60/525,264, entitled "HUMAN VISUAL SYSTEM (HVS)-BASED PRE-FILTERING OF VIDEO DATA," filed Nov. 26, 2003, both of which designate inventor Lalit Sarna, are assigned to the same assignee as the present application, and are incorporated herein by reference in their entirety. For purposes of brevity, such HVS-based pre-processing is summarized herein, and the reader may refer to this co-pending application for further details if desired. In such an embodiment, the HVS-based pre-processing at blocks 500-506 derive from the fact that a lack of high frequency texture information does not have a severe impact on perceptive quality at low bit rates and low spatial resolution.

Furthermore, variable frame rate encoders often drop frames when there are not enough bits available to encode a video frame, and there may be a maximum limit on the number of consecutive frames that can be dropped. The lack of bits can be due to two reasons: 1) the current frame is estimated to produce significantly more than rationed bits for that frame, and/or 2) the previous encoded frames produced more than estimated bits and led to undesired levels of video buffer verifier (VBV) buffer fullness. To respect the maximum limit, very high quantization factor (Q) values are used in existing techniques to reduce the number of bits, but very high Q values lead to abrupt change in video quality and an unpleasant viewer experience. To avoid abrupt changes in Q, an embodiment of the HVS-based pre-processing increases the strength of pre-filtering as the VBV buffer overshoots and with each dropped frame. Doing so leads to a gradual change of the quality over multiple frames, thus maintaining a gradual change in quantization factor.

An embodiment of the hierarchical HVS-based pre-processing at the blocks 500-506 uses at least some of the following information to apply an appropriate filter strength for each frame:

Level of quantization

Motion velocity of objects in frame in reference to the previous frame

Abrupt changes in the scene

Number of consecutive frames skipped

VBV buffer fullness

In temporally compressed videos, estimates of motion velocity and abrupt changes in a scene can be computed after motion estimation at the block 112 of FIG. 1. For the quantization level, the rate control algorithm performed at the block 114 enables the prediction of the lower limit on the quantization value of the frame based on previous quantization history. The number of consecutive frames skipped and VBV buffer fullness are state variables maintained by the encoder(s). Furthermore, as motion and spatial complexity of a video sequence varies with time and quantization levels vary with bit rate, the pre-processing and pre-filtering techniques used in the blocks 500-506 are scalable and adaptive in an embodiment.

Based on these criteria, an embodiment of the HVS-based pre-processing filters at the blocks 500-506 comprise a set of two filters with programmable regions of support and strength:

1) A simple low pass (Gaussian) filter with a programmable region of support and programmable filtering strength, used to remove high frequency coefficients; and 2) A texture-smoothing filter with programmable region of support and programmable strength, used to smooth out high frequency texture information within object boundaries.

Figure 6:
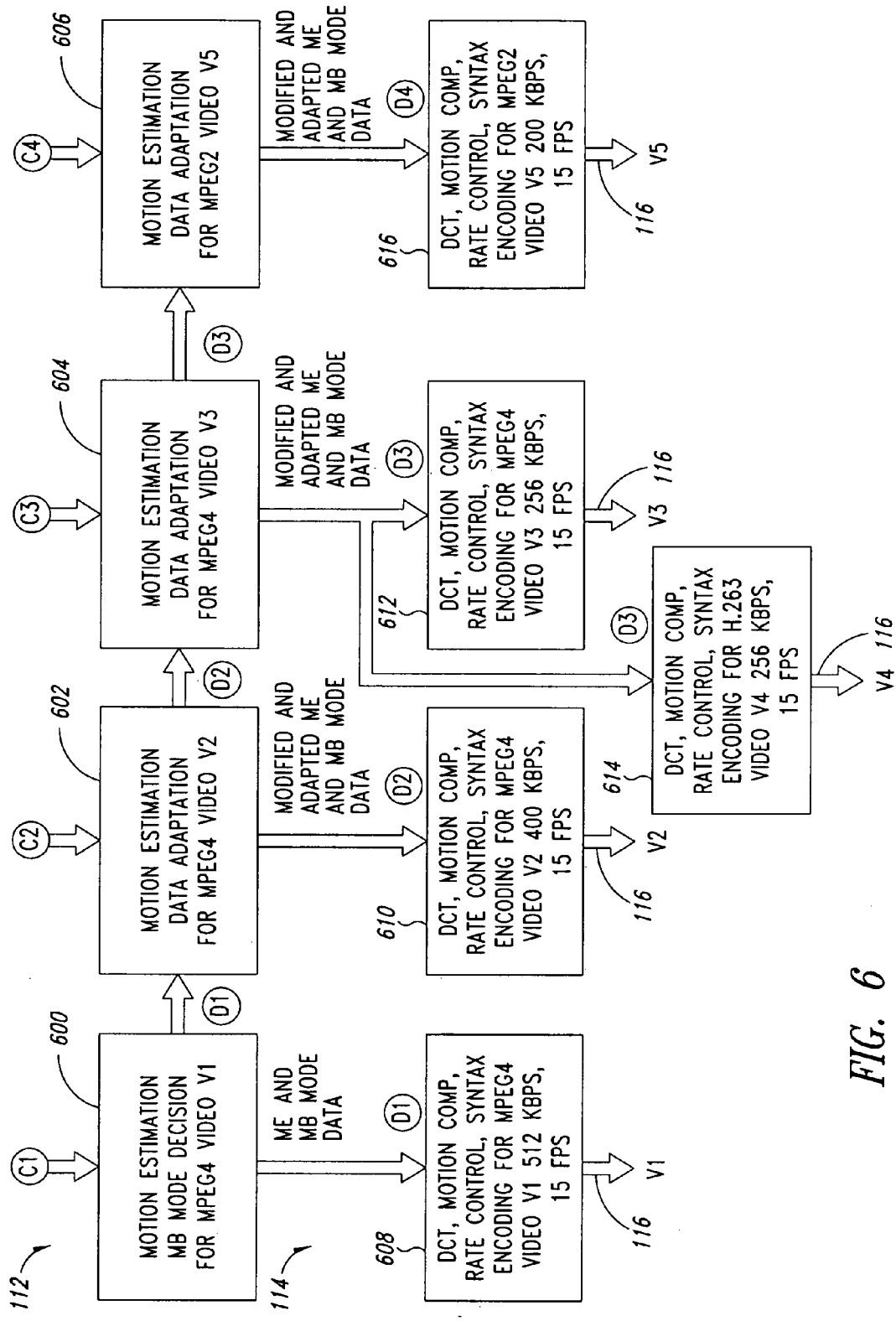

FIG. 6 depicts an embodiment of the motion estimation block 112 and the final encoding block 114 in more detail. Motion estimation and/or motion estimation data adaptation in units or blocks 600-606 are associated with the majority of the computational savings in the hierarchical data sharing approach. In one embodiment, the motion estimation (ME) performed in the block 600 (the results of which are reused or adapted by the other blocks 602-606) is block-based motion estimation. With block-based motion estimation, a macroblock (MB) of data (typically 16×16 pixels in size, but the size of any block of data can be any suitable size) in a current frame first becomes "current" in the block 600. The previous frame in the video sequence is then searched in a specified frame area for a candidate macroblock that most closely matches the current macroblock. Many different search algorithms exists to determine whether a match is present, and which for the sake of brevity will not be described in further detail herein.

Once the closely matching candidate block in the previous frame is located, a motion vector is generated that indicates the relative position between the matching candidate block in the previous frame and the current block in the current frame. Instructions to use the data from the previous frame plus the motion vector information (collectively indicated as "ME and MB mode data" at D1 in FIG. 6) are then sent to a block 608 for final encoding operations. More specifically, motion compensation is performed at the block 608 to use the motion vector to reconstruct the current frame: the encoder already has the macroblock data from the previous frame and therefore uses the motion vector to copy that macroblock data to the new location in the current frame. This process of motion estimation and motion compensation is repeated for all of the macroblocks in the frames.

Other final encoding operations are performed at the block 608, including DCT operations, rate control to control the number of bits per frame, and syntax encoding to place the video data in the appropriate syntax (in this example, the block 608 performs syntax encoding to place the frames in MPEG-4 syntax). These operations would be familiar to those skilled in the art having the benefit of this disclosure, and therefore will not be described in further detail herein. The final video output sequence V1 is produced at 116, having a bit rate of 512 kbps, frame rate of 15 frames/second, and other parameters listed in the table above.

In the block 600, all macroblocks in any current frame are searched for matching candidate blocks in a previous frame and corresponding motion vectors are generated, as is done with existing techniques. Thus, the complete ME and MB mode decisions are made only by the block 600 in this specific example. Since even the fastest search algorithms are fairly computationally expensive, it is desirable to reduce the amount of searching and/or motion vector generation that needs to be performed in other blocks.

Accordingly, one embodiment of the invention provides one or more blocks that hierarchically reuse or adapt the ME and MB data produced by a block that does the complete ME and MB operations (such as the block 600). In this manner, the hierarchical block(s) can reduce the amount and area of their searching by using the prior-generated search data (from another block) as the starting point to focus their searches.

In FIG. 6, therefore as an example, the ME and MB mode data produced by the block 600 at D1 is also provided as input to the block 602, which is designated to perform motion estimation data adaptation for the output video sequence V2. One factor used by the negotiation block 118 to select the output of the block 600 as the input to the block 602 is that the output video sequences V1 and V2 share a common resolution of 352×288. However, because their bit rates are different, their motion vectors will be different, and therefore, the motion vectors generated at the block 600 will need to be modified or adapted appropriately at the block 602 to produce estimates corresponding to the output video sequence V2.

The block 602 uses the search information published by the block 600 as the starting point of the search. In one embodiment, this involves having the block 602 use the motion vector produced by the block 600 to generally focus to an initial search area in a previous frame. While the motion vector generated from the block 600 (for the video sequence V1) may not exactly provide the location of the candidate block for the video sequence V2, that motion vector at least provides an approximate location that can be searched by the block 602.

If there is a match of macroblocks within an empirically determined threshold, no further refinement need be done. If there is no match within the empirically determined threshold, then the searching is refined by the block 602 over smaller search areas as compared to search areas used in the block 600. Techniques to generate and use empirically determined thresholds for matches are familiar to those skilled in the art and will not be described in detail herein.

After finding matching macroblocks, the block 602 generates updated (or new) motion vectors that exactly correspond to the location of the matching macroblocks and generates other search-related information (indicated as generally as "modified and adapted ME and MB mode data" in FIG. 6) at D2. This data is provided to a block 610 for final encoding for the output video sequence V2, including DCT operations, motion compensation to use the updated motion vectors, rate control, syntax encoding, and others. The final output video sequence V2 at 116 has a bit rate of 400 kbps, frame rate of 15 frames/second, and other parameters listed in the table above.

The output D2 of the block 602 is also selected by the negotiation block 118 as input to the block 604, rather than the output of the block 600. This decision was made because the bit rates between the block 602 (400 kbps) and the block 604 (256 kbps) are closer together, as compared to the block 600 (512 kbps). Because the block 604 processes video frames with a scaled-down, lower resolution of 176×144 (as compared to the 352×288 at the block 602), the motion data provided at D2 is averaged and scaled down by the block 604. As before, this motion data (e.g., the motion vector and other search-related data) is used as the starting point for the searching performed by the block 604. The search results are compared with empirically determined thresholds to determine if sufficient matching exists, and refined over smaller search areas if necessary.

Resulting modified and adapted ME and MB mode data is produced by the block 604 at D3. The output at D3 is provided by input to a final encoding block 612, which performs DCT operations, motion compensation, and so forth for the output video sequence V3 to produce MPEG-4 video at 256 kbps, 15 frames/second, and other video parameters listed in the table above.

The output at D3 is also provided as input to a final encoding block 614, which performs DCT operations, motion compensation, rate control, and syntax encoding for H.263 format for the output video sequence V4. The output at D3 was chosen as the input to the block 614 because the output video sequence V4 has the same frame rate, bit rate, and resolution as the output video sequence V3, but differ only in syntax format (e.g., MPEG-4 vs. H.263).

The output at D3 is further used as input to the block 606, which performs motion estimation data adaptation for the output video sequence V5. As before with the other blocks 602 and 604, the block 606 uses the published ME and MB data from a prior block (e.g., the block 604) as a starting point for searching, thereby reducing the amount of searching and motion vector generation that would otherwise need to have been performed fully from the beginning.

The block 606 produces modified and adapted ME and MB data output at D4, which is provided as input to a block 616. The block 616 performs DCT operations, motion compensation, syntax encoding, etc. to produce the output video sequence V5 having an MPEG-2 format, bit rate of 200 kbps, frame rate of 15 frames/second, and so forth at 116.

Therefore, it is evident from the example in FIG. 6 that computational savings are obtained when encoding five video sequences. The computational overhead comprises one full motion estimation and four hierarchical refinements of motion data, as compared to performing five separate individual motion estimations. The logic used by the negotiation block 118 to determine the direction of data flow for motion estimation purposes can be based on factors such as resolution, bit rate, or other criteria that will affect the magnitude and direction of motion vectors and size of search areas.

The above example is just one specific case used to demonstrate an embodiment of the data sharing technology. The architecture is scalable, flexible, and programmable to allow many possible combinations of data sharing at various levels. Each shared block is hierarchical and adaptive in nature in one embodiment. For example, the output video sequences V1-V2 at 116 in FIG. 6 can be respectively fed back to the hierarchical HVS-based pre-processing blocks 500-506 of FIG. 5 to further refine and improve the resulting video image. As indicated in FIG. 1, outputs from the motion estimation at block 114 (corresponding to blocks 600-606 of FIG. 6) may also be fed back to the adaptive HVS-based pre-processing block 110 (corresponding to the blocks 500-506 of FIG. 5).

All encoders with a common source are assigned to one session. At the beginning of the session, each encoder publishes its data requirements.

Based on the characteristics of each encoder, the negotiation block 118 sets up the data flow paths and defines the publisher and consumer relation between various blocks that share data. To further optimize the whole process, the encoders work on shared memory resources in one embodiment, thereby eliminating unnecessary memory copies. There are no hard set limitations on the number of simultaneous encodes. The limitations, if any, originate from time constraints imposed due to the capabilities of hardware processors.

One embodiment of the inventions can be viewed as a single encoder with multiple encoding blocks. Accordingly for the previously described FIGS. 2-6, the various components shown therein can comprise part of a single encoder, with the single encoder having a hierarchical arrangement of encoding blocks that can be used during a single encoding session, to transform a single video input into multiple unique video outputs.

In FIGS. 2-6 above, it is appreciated that not all of the data produced by any particular publisher need necessarily be used by a consumer. The consumer can use all of the publisher's data, just some of it, or none of it, depending on the needs of the consumer and based on negotiation logic used by the negotiation block 118.

Figure 7:
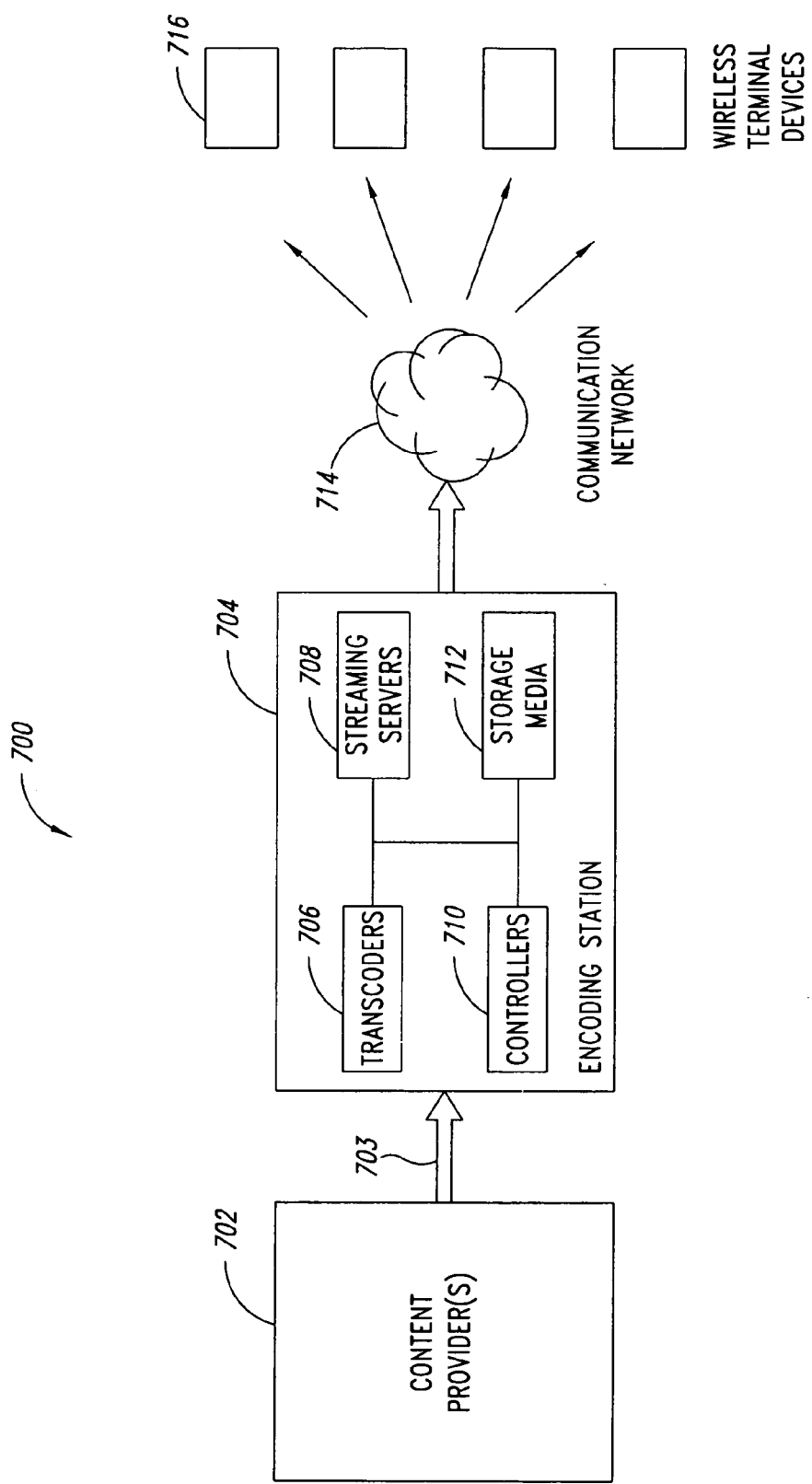
FIG. 7 is a block diagram of a system in which an embodiment of the invention may be implemented.

FIG. 7 is a block diagram of a system 700 in which an embodiment of the invention may be implemented. In particular, content providers 702 provide video content 703 to an encoding station 704. The video content 703 can be live broadcast video, video files, or other type of unformatted raw video or pre-compressed video that can comprise the common video source from which multiple video outputs are encoded using the techniques described above.

The encoding station includes transcoders 706, streaming servers 708, controllers 710, storage media 712, and other components (not shown) that cooperate to receive the common raw unformatted video, encode that video using the techniques described above to produce multiple video outputs, and send the multiple video outputs to wireless terminal devices 716 or other devices.

In an embodiment, the techniques for hierarchical data sharing and data reuse described above can be embodied in software stored in the storage media 712 (or other storage location) and executed by the controller 710 (or other processor) in cooperation with the transcoders 706. Once encoded or transcoded into the appropriate format, bit rate, resolution, frame rate, etc., the multiple unique video outputs are transmitted by the streaming servers 708 to a communication network 714 (such as a wireless network, Internet, telephone network, etc.) for transport to the wireless terminal devices 716.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while embodiments of the invention have been described in the context of video streams, it is possible to provide other embodiments that are applicable to audio-only streams or a combination of audio and video. Hierarchical data reuse systems may be thus be provided to reduce redundancies that otherwise may be present when transmitting audio data, thereby improving the overall efficiency of the audio transmission when there is a need to transmit multiple unique audio streams.

As another example, up-sampling may be performed in some embodiments, instead of the sub-sampling described herein. Up-sampling may be used where desired to increase the resolution, frame rate, or other video characteristic or parameter.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to encode multiple video outputs from a common input video source, the method comprising:
    temporally sub-sampling video frames of the common input video source to reduce a frame rate;
    converting a color format of the video frames from a first format to a second format;
    performing, by a hardware processor, hierarchical Human Visual System (HVS)-based pre-processing to filter high frequency information from the video frames and to generate sequences of video frames having different bit rates;
    performing full motion estimation on a first sequence of video frames and generating motion estimation data to substantially match blocks of pixels from one video frame to another video frame in the first sequence;
    generating a first video output using the generated motion estimation data;
    reusing the generated motion estimation data to perform partial motion on at least a second sequence of video frames to substantially match blocks of pixels from one video frame to another video frame in the second sequence and modifying the generated motion estimation data to correspond to blocks of pixels in the second sequence that match; and
    generating a second video output using the modified motion estimation data.

2. The method of claim 1 wherein said generating the motion estimation data includes generating a motion vector indicative of a location of blocks of pixels in a current frame relative to a previous frame.

3. The method of claim 1 wherein said temporally sub-sampling the video frames includes temporally sub-sampling the video frames once to a frame rate that is common to all video outputs.

4. The method of claim 1 wherein said temporally sub-sampling the video frames includes temporally sub-sampling the video frames in a hierarchical manner, including progressively sub-sampling previously sub-sampled video frames to lower frame rates, with each frame rate corresponding to a different video output.

5. The method of claim 1 wherein said converting the color format of the video frames includes converting the color format once to a color format that is common to all video outputs.

6. The method of claim 1 wherein said converting the color format of the video frames includes converting the color format in a hierarchical manner to multiple color formats, including progressively converting color formats of video frames having previously converted color formats, with each color format corresponding to a different video output.

7. An article of manufacture, comprising:
    a computer-readable medium having computer-readable instructions stored thereon that are executable by a processor to cause said processor to encode multiple video outputs from common input video data, by:
    temporally sub-sampling video frames of the common input video source to reduce a frame rate;
    converting a color format of the video frames from a first format to a second format;
    determining data producer and data user relationships between encoder components;
    directing output produced from a first encoder component to a second encoder component in a same first encoder;
    directing the output produced from the first encoder component to another encoder component in a second encoder different from the first encoder;
    using the output produced from the first encoder component in the second encoder component;
    hierarchically Human Visual System (HVS)-based pre-processing the video frames to obtain different bit rates and to remove high frequency information from the video frames; and
    producing output from the second encoder that is modified from output produced by the first encoder.

8. The article of manufacture of claim 7 wherein said output produced from the first encoder component includes produced full motion estimation data, and wherein using the output produced from the first encoder component in the second encoder component includes using in said second encoder component at least some of the produced full motion estimation data to locate an approximate location of a block of pixels in a frame without performing full motion estimation.

9. The article of manufacture of claim 8 wherein the motion estimation data includes motion vector information.

10. The article of manufacture of claim 7 wherein the computer-readable medium further has computer-readable instructions stored thereon that are executable by said processor to cause the processor to encode multiple video outputs from common input video data, by:
    adapting the hierarchical HVS-based pre-processing based on outputs from subsequent encoder component processing.

11. An apparatus to encode multiple video outputs from common input video data, the apparatus comprising:
- a temporal sub-sampling component to temporally sub-sample video frames of the common input video data to a lower frame rate;
- a color format conversion component to convert the video frames from a first format to a second format;
- a hierarchical arrangement of encoder components wherein output data of at least some of the encoder components are shared as input data to other encoder components of different encoders; and
- a negotiation block to determine data producer and data user relationships between the encoder components and to control flow of the input and output data of the encoder components,
- wherein the hierarchical arrangement of encoder components includes a hierarchical arrangement of Human Visual System (HVS)-based pre-processing filters to reduce high frequency information in video frames and to change bit rates of the video frames, wherein output from one of the HVS-based pre-processing filters of a first encoder are used as input to another one of the HVS-based pre-processing filters of a second encoder.

12. The apparatus of claim 11 wherein the hierarchical arrangement of encoder components further includes:
- a hierarchical arrangement of motion estimation units corresponding to different encoders;
- wherein a first unit of the hierarchical arrangement of motion estimation units performs full motion estimation on a first sequence of video frames and generates motion estimation data to substantially match blocks of pixels from one video frame to another video frame in the first sequence; and
- wherein a second unit of the hierarchical arrangement of motion estimation units uses the generated motion estimation data to perform partial motion estimation on at least a second sequence of video frames to substantially match blocks of pixels from one video frame to another video frame in the second sequence and modifies the generated motion estimation data to correspond to blocks of pixels in the second sequence that match.

13. The apparatus of claim 12, further comprising a final encoder component for each of the encoders, the final encoder components including a motion compensation element to use modified motion estimation data produced by respective said first and second units to re-generate a video frame.

14. The apparatus of claim 11 wherein either one or both of the temporal sub-sampling and color format conversion components performs their respective operations once for all of the multiple video outputs.

15. The apparatus of claim 11 wherein the HVS-based pre-processing filters are adaptive in response to outputs of another encoder component in their same encoder.

16. A system for encoding multiple video outputs from common input video data, the system comprising:
- means for temporally sub-sampling video frames of the common input video to a lower frame rate;
- means for converting a color format of the video frames from a first format to a second format;
- means for hierarchically sharing data output from encoder components, wherein output data of at least some of the encoder components can be shared as input data to other encoder components of different encoders; and
- means for determining data producer and data user relationships between the encoder components and for determining flow of the input and output data of the encoder components,
- wherein the means for hierarchically sharing data includes means for hierarchically Human Visual System (HVS)-based pre-processing video frames.

17. The system of claim 16 wherein the means for hierarchically sharing data further includes means for sharing motion estimation data between different encoders.

18. The system of claim 16, further comprising:
- a means for receiving the common video data; and
- means for transmitting the multiple video outputs to terminal devices.

19. A system to produce multiple video outputs from common input video data, the system comprising:
- an input point at which to receive common input video data for a single encoding session;
- an encoder having a hierarchical arrangement of encoder components, wherein output data of at least some of the encoder components is shared as input data to other encoder components of different encoders;
- a negotiation block to determine data producer and data user relationships between the encoder components and to control flow of the input and output data of the encoder components; and
- a plurality of output points from the hierarchical arrangement of encoder components to output a corresponding plurality of output video that has been processed by the encoder components during the single encoding session,
- wherein the hierarchical arrangement of encoder components includes a hierarchical arrangement of human visual system (HVS)-based filters.

20. The system of claim 19 wherein the hierarchical arrangement of encoder components further includes a hierarchical arrangement of motion estimation and macroblock mode units.

21. The system of claim 19 wherein the common input video data includes raw video data.

22. The system of claim 19 wherein at least some of the hierarchical arrangement of encoder components include software components.

* * * * *